United States Patent
Hu et al.

(10) Patent No.: US 10,021,170 B2
(45) Date of Patent: Jul. 10, 2018

(54) MANAGING A STORAGE ARRAY USING CLIENT-SIDE SERVICES

(71) Applicant: Pure Storage, Inc., Mountain View, CA (US)

(72) Inventors: Jimmy T. Hu, Foster City, CA (US); Terence W. Noonan, Vadnais Heights, MN (US); Neil A. Vachharajani, San Francisco, CA (US); Daquan Zuo, Sunnyvale, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/726,442

(22) Filed: May 29, 2015

(65) Prior Publication Data
US 2016/0352720 A1 Dec. 1, 2016

(51) Int. Cl.
*H04L 29/08* (2006.01)
*H04L 29/06* (2006.01)

(52) U.S. Cl.
CPC .......... *H04L 67/10* (2013.01); *H04L 63/0807* (2013.01); *H04L 67/1097* (2013.01)

(58) Field of Classification Search
CPC . H04L 63/0807; H04L 63/0823; H04L 63/83; H04L 67/10; G06F 21/33
USPC .......................................................... 726/10
See application file for complete search history.

(56) References Cited

U.S. PATENT DOCUMENTS

| | | | |
|---|---|---|---|
| 5,706,210 A * | 1/1998 | Kumano | H04L 43/065 709/224 |
| 5,799,200 A | 8/1998 | Brant et al. | |
| 5,933,598 A | 8/1999 | Scales et al. | |
| 6,012,032 A | 1/2000 | Donovan et al. | |
| 6,085,333 A | 7/2000 | DeKoning et al. | |
| 6,643,641 B1 | 11/2003 | Snyder | |
| 6,647,514 B1 | 11/2003 | Umberger et al. | |
| 6,789,162 B1 | 9/2004 | Talagala et al. | |
| 7,089,272 B1 | 8/2006 | Garthwaite et al. | |
| 7,107,389 B2 | 9/2006 | Inagaki et al. | |

(Continued)

FOREIGN PATENT DOCUMENTS

| EP | 0725324 A2 | 8/1996 |
|---|---|---|
| WO | WO 2012/087648 A1 | 6/2012 |

(Continued)

OTHER PUBLICATIONS

Paul Sweere, *Creating Storage Class Persistent Memory with NVDIMM*, Published in Aug. 2013, Flash Memory Summit 2013, <http://ww.flashmemorysummit.com/English/Collaterals/Proceedings/2013/20130814_T2_Sweere.pdf>, 22 pages.

(Continued)

*Primary Examiner* — Catherine Thiaw
*Assistant Examiner* — Wayne An
(74) *Attorney, Agent, or Firm* — Edward J. Lenart; Kennedy Lenart Spraggins LLP

(57) ABSTRACT

Managing a storage array includes: receiving, by a client-side array services module from a cloud-based security module through data communications on a wide area network, a token representing authentication of user credentials; and managing, by the client-side array services module, a storage array only through data communications on a local area network, including sending, to the storage array, the token with a management instruction.

9 Claims, 7 Drawing Sheets

(56) References Cited

U.S. PATENT DOCUMENTS

| | | |
|---|---|---|
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,527,544 B1 | 9/2013 | Colgrove et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 * | 3/2015 | Bailey ............... G06F 21/35 726/17 |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,455,977 B1 * | 9/2016 | Bailey ............... H04L 63/08 |
| 9,503,442 B1 * | 11/2016 | Griffin ............... H04L 63/08 |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Vana Gundy et al. |
| 2006/0129817 A1 | 6/2006 | Borneman et al. |
| 2006/0161726 A1 | 7/2006 | Lasser |
| 2006/0230245 A1 * | 10/2006 | Gounares et al. ............. 711/170 |
| 2006/0239075 A1 | 10/2006 | Williams et al. |
| 2007/0022227 A1 | 1/2007 | Miki |
| 2007/0028068 A1 * | 2/2007 | Golding ............... G06F 3/0605 711/170 |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2011/0145558 A1 * | 6/2011 | Khosravi ............... G06F 9/4416 713/2 |
| 2011/0167221 A1 * | 7/2011 | Pangal et al. .................. 711/117 |
| 2012/0023144 A1 | 1/2012 | Rub |
| 2012/0054264 A1 | 3/2012 | Haugh et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0080326 A1 * | 3/2013 | Jacola ............... G06Q 40/12 705/44 |
| 2013/0145447 A1 * | 6/2013 | Maron ............... 726/6 |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0074850 A1 | 3/2014 | Noel et al. |
| 2014/0082715 A1 | 3/2014 | Grajek et al. |
| 2014/0086146 A1 * | 3/2014 | Kim et al. ............... 370/328 |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 * | 6/2014 | Nord et al. ............... 713/171 |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 * | 9/2014 | Le Sant et al. ............... 709/224 |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0029840 A1 * | 1/2015 | Kotecha ............... H04L 47/122 370/230 |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378888 A1 | 12/2015 | Zhang et al. |
| 2016/0098323 A1 * | 4/2016 | Mutha ............... G06F 11/1402 707/654 |
| 2016/0350009 A1 | 12/2016 | Cerreta et al. |

(56) References Cited

U.S. PATENT DOCUMENTS

2016/0352830 A1    12/2016   Borowiec et al.
2016/0352834 A1    12/2016   Borowiec et al.

FOREIGN PATENT DOCUMENTS

| | | |
|---|---|---|
| WO | WO2013071087 A1 | 5/2013 |
| WO | WO 2014/110137 A1 | 7/2014 |
| WO | WO 2016/015008 A1 | 12/2016 |
| WO | WO 2016/190938 A1 | 12/2016 |
| WO | WO 2016/195759 A1 | 12/2016 |
| WO | WO 2016/195958 A1 | 12/2016 |
| WO | WO 2016/195961 A1 | 12/2016 |

OTHER PUBLICATIONS

PCMag. "Storage Array Definition". Published May 10, 2013. <http://web.archive.org/web/20130510121646/http://www.pcmag.com/encyclopedia/term/52091/storage-array>, 2 pages.

Google Search of "storage array define" performed by the Examiner on Nov. 4, 2015 for U.S. Appl. No. 14/725,278, Results limited to entries dated before 2012, 1 page.

Techopedia. "What is a disk array". Published Jan. 13, 2012. <http://web.archive.org/web/20120113053358/http://www.techopedia.com/definition/1009/disk-array>, 1 page.

Webopedia. "What is a disk array". Published May 26, 2011. <http://web/archive.org/web/20110526081214/http://www-,webopedia.com/TERM/D/disk_array.html>, 2 pages.

Li et al., *Access Control for the Services Oriented Architecture*, Proceedings of the 2007 ACM Workshop on Secure Web Services (SWS '07), Nov. 2007, pp. 9-17, ACM New York, NY.

The International Serach Report and the Written Opinoin received from the International Searching Authority (ISA/EPO) for International Application No. PCT/US2016/015006, dated Apr. 29, 2016, 12 pages.

The International Serach Report and the Written Opinoin received from the International Searching Authority (ISA/EPO) for International Application No. PCT/US2016/015008, dated May 4, 2016, 12 pages.

C. Hota et al., *Capability-based Cryptographic Data Access Controlin Cloud Computing*, Int. J. Advanced Networking and Applications, col. 1, Issue 1, dated Aug. 2011, 10 pages.

The International Search Report and the Written Opinion received from the International Searching Authority (ISA/EPO) for International Application No. PCT/US2016/020410, dated Jul. 8, 2016, 17 pages.

The International Search Report and the Written Opinion received from the International Searching Authority (ISA/EPO) for International Application No. PCT/US2016/032084, dated Jul. 18, 2016, 12 pages.

Faith, "Dictzip file format", GitHub.com (online). [accessed Jul. 28, 2015], 1 page, URL: https://github.com/fidlej/idzip.

Wikipedia, "Convergent Encryption", Wikipedia.org (online), accessed Sep. 8, 2015, 2 pages, URL: en.wikipedia.org/wiki/Convergent_encryption.

Storer et al., "Secure Data Deduplication", Proceedings of the 4th ACM International Workshop on Storage Security and Survivability (StorageSS'08), Oct. 2008, 10 pages, ACM New York, NY. USA. DOI: 10.1145/1456469.1456471.

The International Serach Report and the Written Opinoin received from the International Searching Authority (ISA/EPO) for International Application No. PCT/US2016/016333, dated Jun. 8, 2016, 12 pages.

ETSI, *Network Function Virtualisation (NFV); Resiliency Requirements*, ETSI GS NFCV-REL 001, V1.1.1, http://www.etsi.org/deliver/etsi_gs/NFV-REL/001_099/001/01.01.01_60/gs_NFV-REL001v010101p.pdf (online), dated Jan. 2015, 82 pages.

The International Search Report and the Written Opinoin received from the International Searching Authority (ISA/EPO) for International Application No. PCT/US2016/032052, dated Aug. 30, 2016, 17 pages.

Microsoft, "Hybrid for SharePoint Server 2013—Security Reference Architecture", <http://hybrid.office.com/img/Security_Reference_Architecture.pdf> (online), dated Oct. 2014, 53 pages.

Microsoft, "Hybrid Identity", <http://aka.ms/HybridIdentityWp> (online), dated Apr. 2014, 36 pages.

Microsoft, "Hybrid Identity Management", <http://download.microsoft.com/download/E/A/E/EAE57CD1-A80B-423C-96BB-142FAAC630B9/Hybrid_Identity_Datasheet.pdf> (online), published Apr. 2014, 17 pages.

Jacob Bellamy-Mcintyre et al., "OpenID and the EnterpriseL A Model-based Analysis of Single Sign-On Authentication", 2011 15th IEEE International Enterprise Distributed Object Computing Conference (EDOC), DOI: 10.1109/EDOC.2011.26, ISBN: 978-1-4577-0362-1, <https://www.cs.auckland.ac.nz/~lutteroth/publications/McIntyreLutterothWeber2011-OpenID.pdf> (online), dated Aug. 29, 2011, 10 pages.

The International Search Report and the Written Opinoin received from the International Searching Authority (ISA/EPO) for International Application No. PCT/US2016/035492, dated Aug. 17, 2016, 10 pages.

The International Search Report and the Written Opinion received from the International Searching Authority (ISA/EPO) for International Application No. PCT/US2016/036693, dated Aug. 29, 2016, 10 pages.

The International Search Report and the Written Opinion received from the International Searching Authority (ISA/EP) for International Application No. PCT/US2016/038758, dated Oct. 7, 2016, 10 pages.

The International Search Report and the Written Opinion received from the International Searching Authority (ISA/EP) for International Application No. PCT/US2016/040393, dated Sep. 22, 2016, 10 pages.

The International Search Report and the Written Opinion received from the International Searching Authority (ISA/EP) for International Application No. PCT/US2016/044020, dated Sep. 30, 2016, 11 pages.

Kwok Kong, *Using PCI Express as the Primary System Interconnect in Multiroot Compute, Storage, Communications and Embedded Systems*, IDT, White Paper, <http://www.idt.com/document/whp/idt-pcie-multi-root-white-paper>, retrieved by WIPO Dec. 4, 2014, dated Aug. 28, 2008, 12 pages.

The International Search Report and the Written Opinion received from the International Searching Authority (ISA/EP) for International Application No. PCT/US2016/044874, dated Oct. 7, 2016, 11 pages.

The International Search Report and the Written Opinion received from the International Searching Authority (ISA/EP) for International Application No. PCT/US2016/044875, dated Oct. 5, 2016, 13 pages.

The International Search Report and the Written Opinion received from the International Searching Authority (ISA/EP) for International Application No. PCT/US2016/044876, dated Oct. 21, 2016, 12 pages.

The International Search Report and the Written Opinion received from the International Searching Authority (ISA/EP) for International Application No. PCT/US2016/044877, dated Sep. 29, 2016, 13 pages.

Xiao-Yu Hu et al., *Container Marking: Combining Data Placement, Garbage Collection and Wear Levelling for Flash*, 19th Annual IEEE International Symposium on Modeling, Analysis, and Simulation on Computer and Telecommunications Systems, ISBN: 978-0-7695-4430-4, DOI: 10.1109/MASCOTS.2011.50, dated Jul. 25-27, 2011, 11 pages.

\* cited by examiner

MANAGING A STORAGE ARRAY USING CLIENT-SIDE SERVICES

BACKGROUND

Field of Technology

The field of technology is data processing, or, more specifically, methods, apparatus, and products for managing a storage array.

Description of Related Art

Data centers may include many computing components including servers, network devices, and storage arrays. As the need for storage of large amounts of data and efficient access to that data increases, storage array technology is advancing. Such storage arrays may provide persistent storage for any number of computing devices in a data center. Given that many data centers provide services to many different users, various considerations must be taken into account to provide efficient, useful, and secure access to and administration of storage arrays. Security of storage array administration and access to storage array services may be highly complex.

SUMMARY

Methods, apparatus, and products for managing a storage array are disclosed in this specification. Such management includes: receiving, by a client-side array services module from cloud-based security module through data communications on a wide area network, a token representing authentication of user credentials; and managing, by the client-side array services module, a storage array only through data communications on a local area network, including sending, to the storage array, the token with a management instruction.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatus, and products for managing a storage array in accordance with the present invention are described with reference to the accompanying drawings, beginning with FIG. 1.

Figure 1:
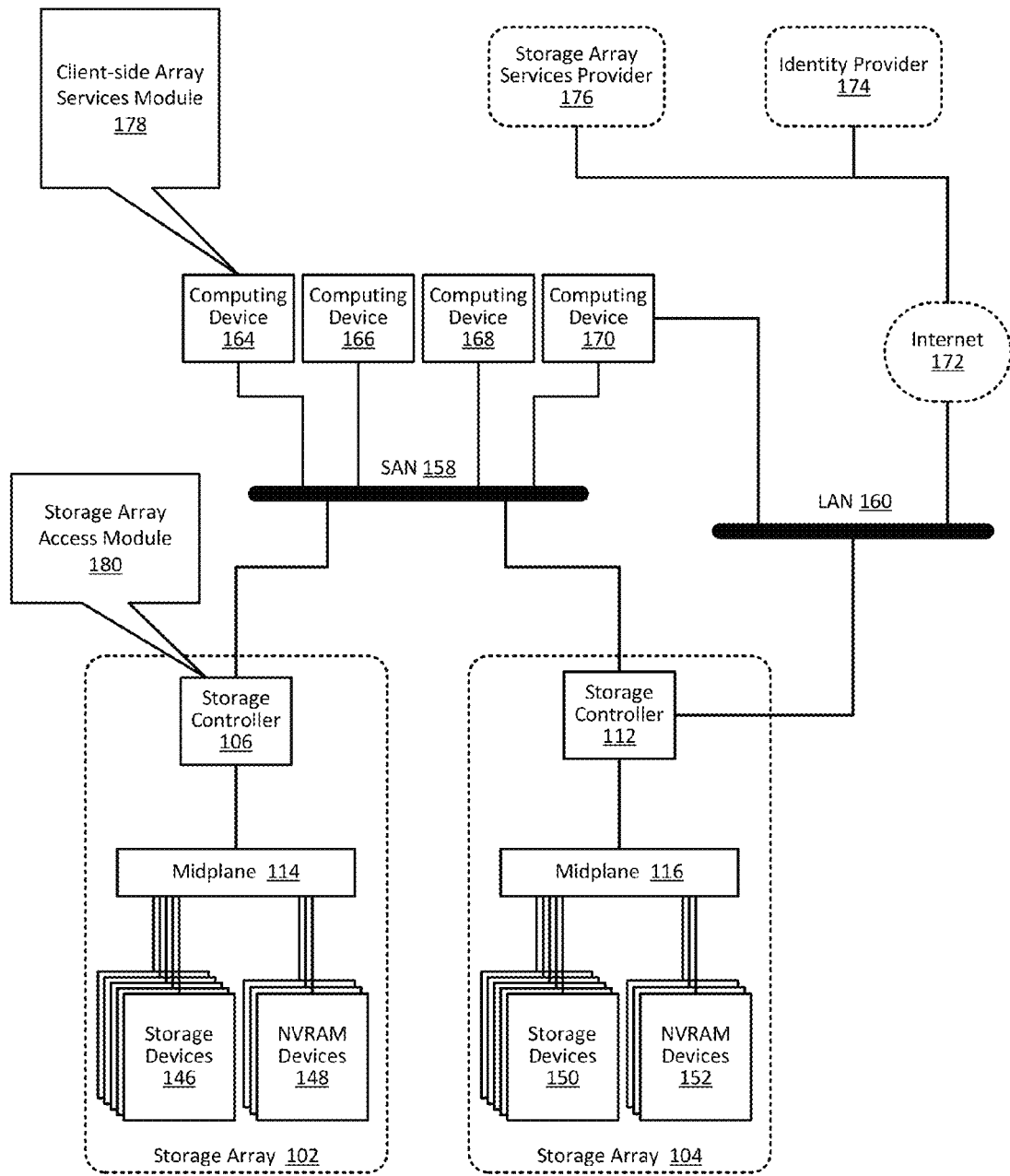
FIG. 1 sets forth a block diagram of a system configured for managing a storage array according to embodiments of the present invention.

FIG. 1 sets forth a block diagram of a system configured for managing a storage array according to embodiments of the present invention. The system of FIG. 1 includes a number of computing devices (164, 166, 168, 170). Such computing devices may be implemented in a number of different ways. For example, a computing device may be a server in a data center, a workstation, a personal computer, a notebook, or the like.

The computing devices (164-170) in the example of FIG. 1 are coupled for data communications to a number of storage arrays (102, 104) through a storage area network (SAN) (158) as well as a local area network (160) (LAN). The SAN (158) may be implemented with a variety of data communications fabrics, devices, and protocols. Example fabrics for such a SAN may include Fibre Channel, Ethernet, Infiniband, SAS (Serial Attached Small Computer System Interface), and the like. Example data communications protocols for use in such a SAN (158) may include ATA (Advanced Technology Attachment), Fibre Channel Protocol, SCSI, iSCSI, HyperSCSI, and others. Readers of skill in the art will recognize that a SAN is just one among many possible data communications couplings which may be implemented between a computing device and a storage array. Any other such data communications coupling is well within the scope of embodiments of the present invention.

The local area network (160) of FIG. 1 may also be implemented with a variety of fabrics and protocols. Examples of such fabrics include Ethernet (802.3), wireless (802.11), and the like. Examples of such data communications protocols include TCP (Transmission Control Protocol), UDP (User Datagram Protocol), IP (Internet Protocol), HTTP (HyperText Transfer Protocol), WAP (Wireless Access Protocol), HDTP (Handheld Device Transport Protocol), SIP (Session Initiation Protocol), RTP (Real Time Protocol) and others as will occur to those of skill in the art.

The example storage arrays (102, 104) of FIG. 1 provide persistent data storage for the computing devices. Each storage array (102, 104) includes a storage controller (106, 112). The storage controller is a module of automated computing machinery comprising computer hardware, computer software, or a combination of computer hardware and software. The storage controller may be configured to carry out various storage-related tasks. Such tasks may include writing data received from a computing device to storage, erasing data from storage, retrieving data from storage to provide to a computing device, monitoring and reporting of disk utilization and performance, performing RAID (Redundant Array of Independent Drives) or RAID-like data redundancy operations, compressing data, encrypting data, and so on.

Each storage controller (106, 112) may be implemented in a variety of ways, including as an FPGA (Field Programmable Gate Array), a PLC (Programmable Logic Chip), an ASIC (Application Specific Integrated Circuit), or computing device that includes discrete components such as a central processing unit, computer memory, and various adapters. Each storage controller (106, 112) may, for example, include a data communications adapter configured to support communications via the SAN (158) and the LAN (160). Only one of the storage controllers (112) in the example of FIG. 1 is depicted as coupled to the LAN (160) for data communications for clarity. Readers should understand that both storage controllers (106, 112) are independently coupled to the LAN (160). Each storage controller (106, 112) may also, for example, include an I/O controller or the like that couples the storage controller (106, 112) for data communications, through a midplane (114), to a number of storage devices (146, 150), and a number of write buffer devices (148, 152) devices.

Each write buffer device (148, 152) may be configured to receive, from the storage controller (106, 112), data to be stored in the storage devices (146). Such data may originate from any one of the computing devices (164-170). In the example of FIG. 1, writing data to the write buffer device may be carried out more quickly than writing data to the storage device. The storage controller (106, 112) may be configured to effectively utilize the write buffer devices (148, 152) as a quickly accessible redundant buffer for data destined to be written to storage. In this way, if the storage device to which the data is to be written fails or if the write does not complete, the write buffer device may maintain the data to be written during a retry of the write or during failover of the storage device to another location. That is, the write buffer device may provide redundancy for the storage devices.

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives ("Flash drives"), and the like.

In addition to being coupled to the computing devices through the SAN (158), the storage arrays may also be coupled to the computing devices through the LAN (160) and to one or more cloud service providers through the Internet (172). The term 'cloud' as used in this specification refers to systems and computing environments that provide services to user devices through the sharing of computing resources through a network. Generally, the user device is unaware of the exact computing resources utilized by the cloud system to provide the services. Although in many cases such 'cloud' environments or systems are accessible via the Internet, readers of skill in the art will recognize that any system that abstracts the use of shared resources to provide services to a user through any network may be considered a cloud-based system.

One example cloud service in FIG. 1 is a storage array services provider (176). The storage array service provider (176) may be configured to provide various storage array services such as reporting of storage array performance characteristics, configuration control of the storage arrays, and the like. The storage array services provider may rely on modules executing on the storage array itself to gather or process such data.

Another example cloud service in FIG. 1 is an identity provider (174). An identity provider (IDP) is a cloud service that may be configured to provide identifiers for users looking to interact with a system and assert to such a system that an identifier presented by a user is known to the IDP. In the example of FIG. 1, the IDP (174) may authenticate user credentials of the computing devices (164-170) for access to the storage arrays (102, 104).

The system of FIG. 1 may be configured, according to embodiments of the present invention, to provide authorization as well as authentication for a user of a storage array. To that end, either of the IDP (174) or cloud-based storage array services provider (176) may be configured to include or operate as a cloud-based security module. Such a cloud-based security module as the term is used in this specification refers to a module of automated computing machinery that includes computer hardware, computer software, or an aggregation of hardware and software that is configured for providing authorization and authentication in a cloud for a user of a storage array according to embodiments of the present invention.

The cloud-based security module may receive, from a client-side array services module, user credentials. Such user credentials may take various forms including, for example, a user identifier and password.

A client-side array services module is a module of automated computing machinery that includes computer hardware, computer software, or an aggregation of hardware and software that is configured to present, locally, a user interface for accessing cloud-based storage array services. A client-side array services module be implemented in a variety of ways, as a command-line interface, a graphical user interface ('GUI'), as a web service, as a web browser or component of a web browser, or the like. The client-side array services module may access services provided by the storage array services provider (176) through an application program interface (API) presented by the storage array services provider.

In some embodiments, the client-side array services module may be a web browser configured for cross-domain resource sharing. Web browsers configured according to the HTML 5 standard, for example, may implement CORS (Cross-Origin Resource Sharing). CORS enables one web page in a first domain to request resources provided by a second web page in a second domain. To that end, the client-side array services module (178) in the example of FIG. 1, may present a user interface that appears to be a portal to access storage array services (such as those provided by the cloud-based storage array services provider), while relying entirely on a third party (such as the IDP) to perform authentication of the user's identity. Further, each storage array (102, 104) may be a separate origin.

The client-side array services module (178) may provide one or more service options to a user of a storage array. Such service options may be services supported by the cloud-based storage array services provider (176). Upon selection of one of those service options, the client-side array services module (178) may prompt a user for user credentials and receive those user credentials through one or more user input devices. The client-array services module (178) may then provide those user credentials to the identity provider through the LAN (160) and Internet (172).

Upon receipt, the IDP may authenticate the user credentials, identify authorized access privileges defining one or more storage array services accessible by the user, generate a token representing the authentication of the user credentials and the authorized access privileges; and provide the token to the client-side array services module (178). In some embodiments, the IDP need only provide authentication rather than authorization of access privileges. In embodiments in which the IDP provides both authorization and authentication, the access privileges for a user define the user's accessibility to storage array services. Different users may be provided access to different services for security purposes. Users may granted be access to services for all storage arrays or only subset of all of the storage arrays. Further, a 'user' may be a user of the storage array (one who stores and retrieves data in the storage array) or a system administrator that manages the storage array.

The access privileges may be defined in the cloud-based security module (the IDP in the example of FIG. 1) for users with an association of each user with one of a plurality of profiles, and each profile may specify access privileges for users associated with the profile. Each user may be associated with one or more profiles. Examples of such profiles may include: a read-only profile specifying, for users associated with the read only profile, read-only access privileges; a modify profile specifying, for users associated with the modify profile, read and modify access privileges; and an administrator profile specifying, for users associated with the administrator profile, all available access privileges. Readers will understand that these are but a few of many possible profiles that may be implemented. For example, a profile may be implemented that is storage-array specific profile. Such a profile may specify, for users associated with that profile, access privileges for a single storage array. In other embodiments, a multi-array profiles may be implemented that specifies, for user associated with that profile, access privileges for multiple storage arrays.

Throughout this process, a user need only "sign-on" a single time to access services at the storage array even though a third party (the IDP in this example) provides the authentication and authorization. Such a single sign on is enabled in the client-side array services module (178) through the cross-domain resource sharing provided by the client-side array services module (178). After authentication and authorization, as long as the user maintains a session with the client-side array services module (178) and the client-side array services module (178) maintains the token generated by the IDP (174), the user need not sign in again to subsequently access services at the storage array.

Although the IDP (174) in the example of FIG. 1 is described as performing the operations of a cloud-based security module (authentication and authorization), such operations may also be performed by other modules. In the system of FIG. 1, for example, the storage array services provider (176) may, in addition to providing various storage array services to users, perform the authentication and authorization of a user as described above.

Once the client-side array services module receives the token, the client-side array services module (178) may manage the storage arrays (106, 112) in accordance with embodiments of the present invention. More specifically, the client-side array services module (178) may manage the storage arrays (106, 112) only through data communications on the local area network (160) by sending the token along with one or more management instructions to the storage array. In this way, as long as the client-side array services module (178) is authenticated and coupled to the storage arrays via the LAN (160), the client-side array services module (178) may manage the storage arrays without any data communications outside the LAN. By contrast, systems of the prior art typically must execute an agent within the local area network that opens a port for two-way communication with the cloud services provider. In such prior art embodiments, the cloud services provider receives a selection of a management task from the client-side array services module and sends through the open port to the agent one or more management instructions to carry out the management task. The agent then proceeds to send the management instructions along to the storage arrays. The open port between an agent within the local area network and the cloud services provider outside the local area network creates a possible security concern. If, for example, the cloud services provider were to be compromised, the comprising actor has an open port to the storage arrays through the agent.

The arrangement of computing devices, storage arrays, cloud-based service providers, networks and other devices making up the exemplary system illustrated in FIG. 1 are for explanation, not for limitation. Systems useful according to various embodiments of the present invention may include different configurations of servers, routers, switches, computing devices, and network architectures, not shown in FIG. 1, as will occur to those of skill in the art.

Figure 2:
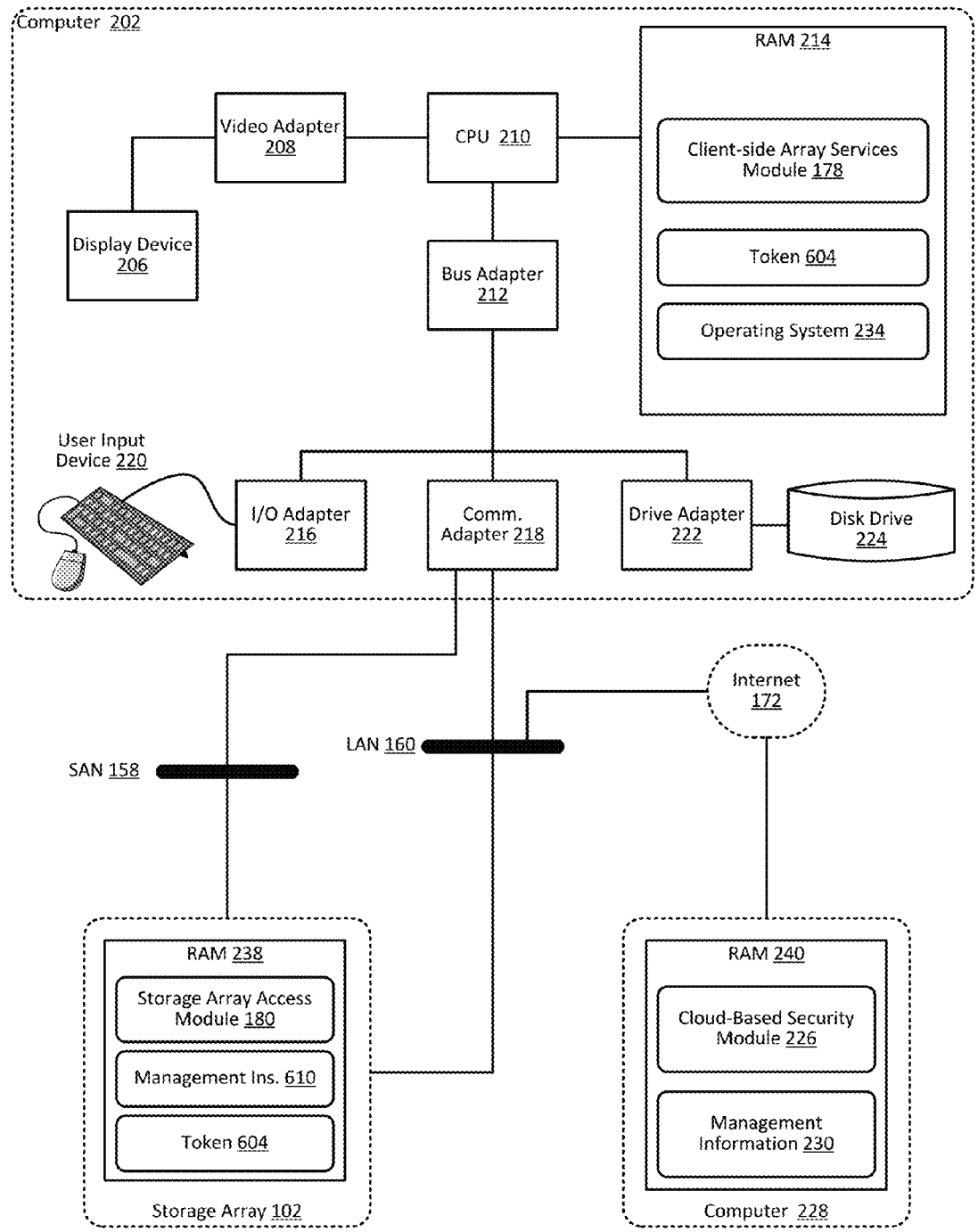
FIG. 2 sets forth a block diagram of several example computers useful for managing a storage array according to embodiments of the present invention.

Managing a storage array in accordance with embodiments of the present invention is generally implemented with computers. In the system of FIG. 1, for example, all the computing devices (164-170), storage controllers (106, 112), storage array services provider (176), and identity provider (174) may be implemented to some extent at least as computers. For further explanation, therefore, FIG. 2 sets forth a block diagram of several example computers useful for managing a storage array according to embodiments of the present invention. The example computers in FIG. 2 include a computer (202) configured to execute a client-side array services module (178), a storage array (102), and a computer (228) configured to execute a cloud-based security module (226). For clarity, only one computer (202) in the example of FIG. 2 is depicted with a number of various computing components which are described below in greater detail. Readers will understand that the storage array (102) and the computer (228) may include similar components that operate in a similar manner.

The computer (202) of FIG. 2 includes at least one computer processor (210) or 'CPU' as well as random access memory (214) ('RAM') which is connected through a high speed memory bus and bus adapter (212) to processor (210) and to other components of the computer (202). Stored in RAM (214) is a client-side array services module (178) comprising a module of automated computing machinery configured to manage the storage array (102) in accordance with embodiments of the present invention. To that end, the client-side array services module may provide user credentials to the cloud-based security module (226) for authentication and receive, from the cloud-based security module (226) through data communications on a wide area network (172), a token (604) representing authentication of user credentials. The client-side array services module (178) may then manage the storage array (102) only through data communications on the local area network (160). Such management may include sending, to the storage array (102), the token (604) with a management instruction (610).

Stored in RAM (240) of computer (228) is the cloud-based security module (226), a module of computer program instructions that, when executed, causes the computer (202) of FIG. 2 to provide authentication in the cloud for a user of the storage array (102) in accordance with embodiments of the present invention. To that end, the cloud-based security module (226) receives, from the client-side array services module, the user credentials mention above; authenticates the user credentials; generates the token (604) representing the authentication of the user credentials; and provides the token to the client-side array services module. The cloud-based security module (226) may authorize the user for access privileges and provide such authorization along with the token (604). The token may be digitally signed by the cloud-based security module (226) such that the storage array may trust any communication that includes such token.

In the example of FIG. 2, the client-side user computer (202) is depicted as being coupled through the SAN (158) to the storage array (102) for use in storing data in the storage array. Alternatively, the client-side user computer (202) may be a device that is not connected to the storage array (102)

for purposes of storing data but rather may be connected only via a LAN for purposes of performing storage array management services (other than writing or reading data from storage devices). Consider, for example, a client-side user computer that is implemented as a mobile device that is carried by a system administrator. Although the mobile device is not coupled to the storage array for purposes of data storage, the system administrator may utilize the mobile device to perform various management tasks and request reporting services that indicate storage array performance characteristics, errors, alerts, and the like.

The storage array access module (180) may be implemented as a module of computer program instructions stored in RAM (238) and executed by a processor (not shown) of the storage array (102). The storage array access module may be configured to receive the management instructions (610) from the client-side array services module (178) along with the token (604). Responsive to confirming the authenticity of the token (604), the storage array access module (180) may perform the management task provided in the management instruction.

Turning back to the components of the computer (202), also stored in RAM (214) is an operating system (234). Examples of operating systems useful in computers configured according to embodiments of the present invention include UNIX™, Linux™, Microsoft Windows™, and others as will occur to those of skill in the art. The operating system (234) and the cloud-based security module (226) in the example of FIG. 2 are shown in RAM (168), but many components of such software typically are stored in non-volatile memory also, such as, for example, on a disk drive (224). Likewise, the modules depicted in RAM (238, 240) of the storage array (102) and client-side user computer (204) may be stored in non-volatile memory.

The computer (202) of FIG. 2 also includes disk drive adapter (222) coupled through an expansion bus and bus adapter (212) to the processor (210) and other components of the computer (202). Disk drive adapter (222) connects non-volatile data storage to the computer (202) in the form of disk drive (224). Disk drive adapters may be implemented in a variety of ways including as SATA (Serial Advanced Technology Attachment) adapters, PATA (Parallel ATA) adapters, Integrated Drive Electronics ('IDE') adapters, Small Computer System Interface ('SCSI') adapters, and others as will occur to those of skill in the art. Non-volatile computer memory also may be implemented as an optical disk drive, electrically erasable programmable read-only memory (so-called 'EEPROM' or 'Flash' memory), RAM drives, and so on, as will occur to those of skill in the art.

The example computer (202) of FIG. 2 includes one or more input/output ('I/O') adapters (216). I/O adapters implement user-oriented input/output through, for example, software drivers and computer hardware for controlling output to display devices such as computer display screens, as well as user input from user input devices (220) such as keyboards and mice. The example computer (202) of FIG. 2 also includes a video adapter (208), which is an example of an I/O adapter specially designed for graphic output to a display device (206) such as a display screen or computer monitor. Video adapter (208) is connected to the processor (210) through a high speed video bus.

The exemplary computer (202) of FIG. 2 includes a communications adapter (218) for data communications with other computers (102, 204) through the Internet (172). Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of such communications adapters useful include modems for wired dial-up communications, Ethernet (IEEE 802.3) adapters for wired data communications, and 802.11 adapters for wireless data communications.

Figure 3:
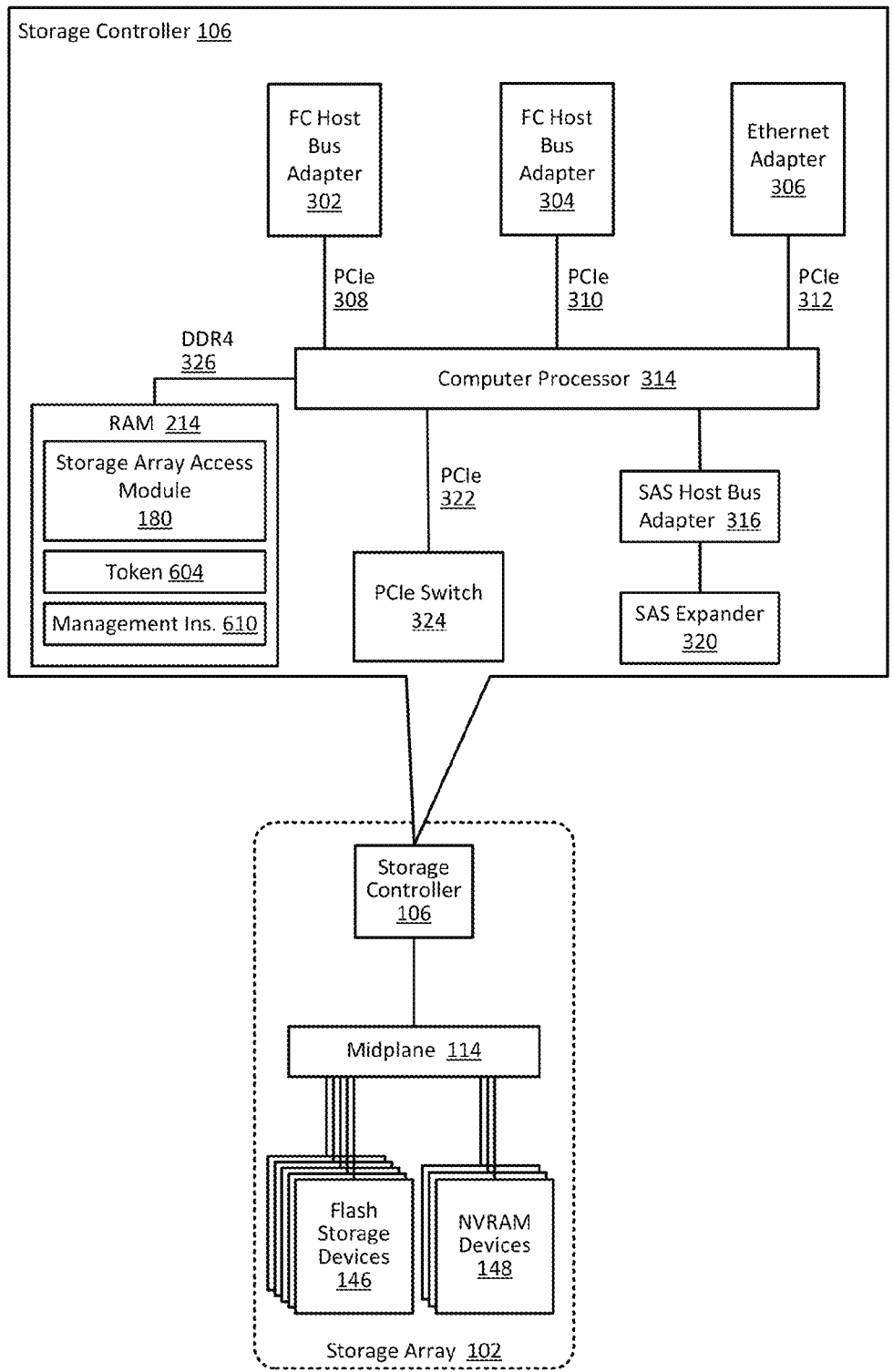
FIG. 3 sets forth a block diagram of an example storage controller of a storage array managed in accordance with embodiments of the present invention.

As mentioned above, the storage array (102) may include many similar components as the computer (202). For further explanation, therefore, FIG. 3 sets forth a block diagram of an example storage controller (106) of a storage array (102). The example storage controller includes a computer processor (314). The computer processor is coupled to RAM (214) through a DDR4 (Double-Data Rate 4) bus. Stored in RAM (214) is a storage array access module (180) that operates as described above to perform management tasks represented by a management instruction (610) received along with a token (604) from a client-side array services module.

The processor (314) is also coupled for data communications through PCIe (Peripheral Component Interface express) links (308, 310, 312, 322) to several Fibre Channel host bus adapters (302, 304), an Ethernet adapter (306), and a PCIe switch (324). The Fibre Channel host bus adapters (308, 310) may couple the storage controller to a storage area network, such the SAN (158) depicted in the example of FIGS. 1 and 2. The Ethernet adapter (306) may couple the storage controller to a local area network such as the LAN (160) depicted in the example of FIGS. 1 and 2. The PCIe switch (324) may provide data communications across other PCI links through the midplane to PCI endpoints, such as storage devices or write buffer devices. Likewise, the processor (314) is also coupled through a SAS (Serial Attached SCSI) host bus adapter (316) to a SAS expander (320). The SAS expander may provide SAS connections between the computer processor (314) and other devices through the midplane.

Readers of skill in the art will recognize that these components, protocols, adapters, and architectures are for illustration only, not limitation. Such a storage controller may be implemented in a variety of different ways. Each such way is well within the scope of the present invention.

Figure 4:
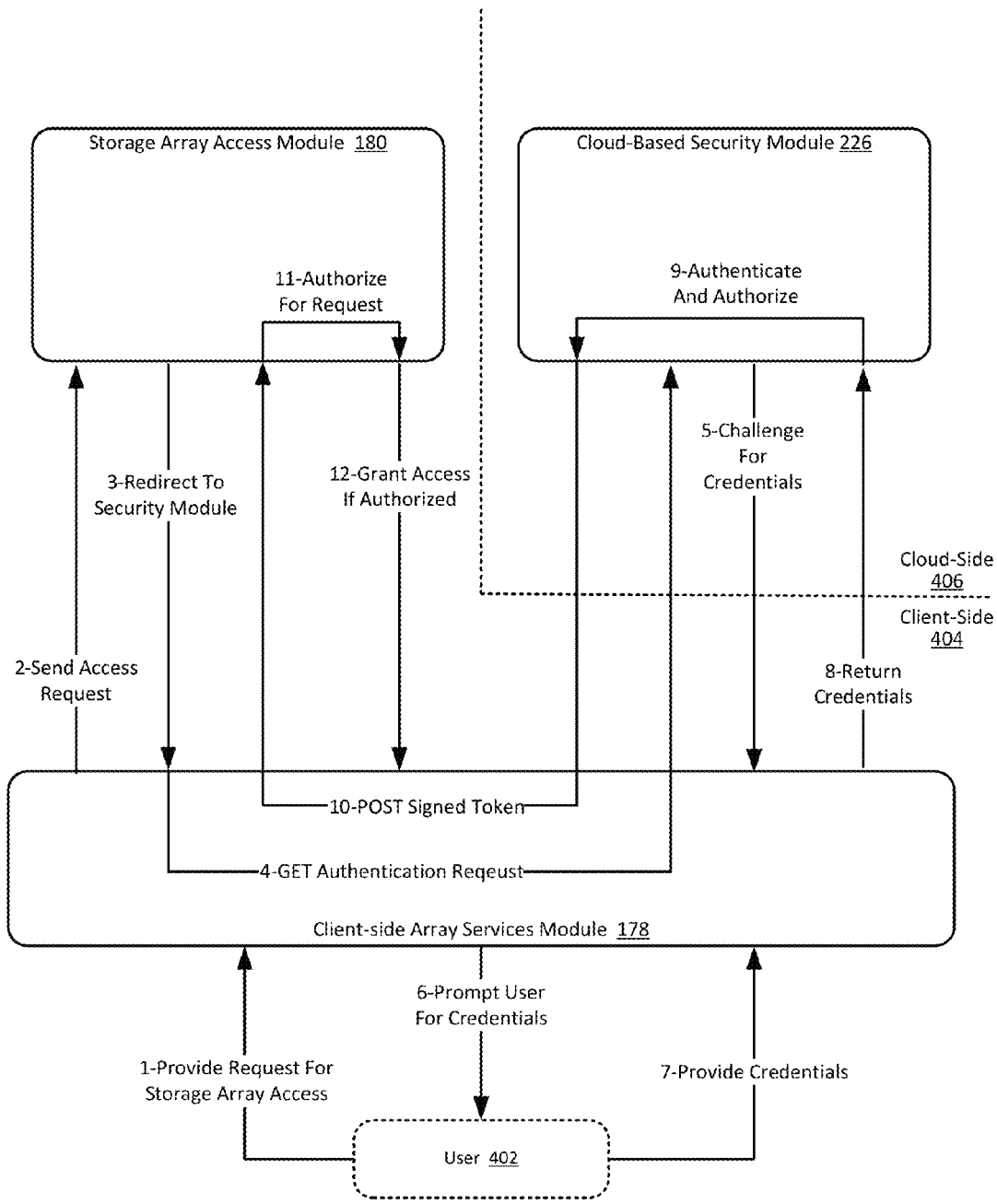
FIG. 4 sets for than example block diagram of a system carrying out authorization and authentication in a cloud for a user of a storage array in accordance with embodiments of the present invention.

For further explanation, FIG. 4 sets for than example block diagram of a system carrying out authorization and authentication in a cloud for a user of a storage array in accordance with embodiments of the present invention. The block diagram includes a storage array access module (180), a cloud-based security module (226), a client-side array services module (178), and a user (402). The cloud-based security module (226) is depicted as 'cloud-side' (406) meaning accessible through a wide area network rather than locally on a local area network. The remaining modules are depicted as client-side meaning accessible through a local area network. The example of FIG. 4 depicts one example order of interactions amongst the modules and users during authentication and authorization in accordance with embodiments of the present invention. Readers will understand that FIG. 4 is an example only, not a limitation. In fact, many of the steps set forth in the example may be carried out in a different order and all such ways are well within the scope of the present invention.

In the example of FIG. 4, the user first provides a request for storage array access to the client-side array services module (178). The client-side array services module (178) then forwards that request to the storage array access module (180). The storage array access module (180), determines that no token yet exists for the user and redirects the client-side array services module (178) to the cloud-based security module for sign-on and authentication. The client-side array services module receives, after the redirect and from the cloud-based security module (226), a challenge for credentials with which the client-side array services module (178) prompts the user. The user (402) provides the user credentials to the client-side array services module which returns the credentials to the cloud based security module (226) as a response to the challenge for the credentials. Readers of skill in the art will recognize that once a user receives a token from the cloud-based security module, a session is instantiated between the user and the storage array such that the user need not be prompted for nor provide credentials upon each subsequent access request.

The cloud-based security module (226) then authenticates and authorizes the user credentials and, through a "POST" HTTP instruction provides a signed token representing both authentication of the user credentials and authorization of the user to access one or more storage array services. The term 'signed token' refers to a token that includes a digital signature verifying the authenticity of the sender, in this case, the cloud-based security module. The client-side array services module operates as a proxy and provides the token to the storage array access module (180). The storage array access module, determines, in dependence upon the token, whether the user (402) is authorized for the particular access request. In the example of FIG. 4, the user is authorized and the storage array module grants access to the client-side array services module (178).

Once the client-side array services module (178) receives the token, the client-side array services module may send management instructions and the token along to the storage array access module (180) to perform management of the storage array in accordance with embodiments of the present invention.

Readers of skill in the art will recognize that FIG. 4 sets forth an example of one-way authentication in which a user provides credentials to the cloud-based security module (226) for authentication. Such one-way authentication is an example and not a limitation. Two-way, or mutual, authentication may also be employed for systems that provide authorization and authentication in a cloud for a user of a storage array according to embodiments in of the present invention.

Figure 5:
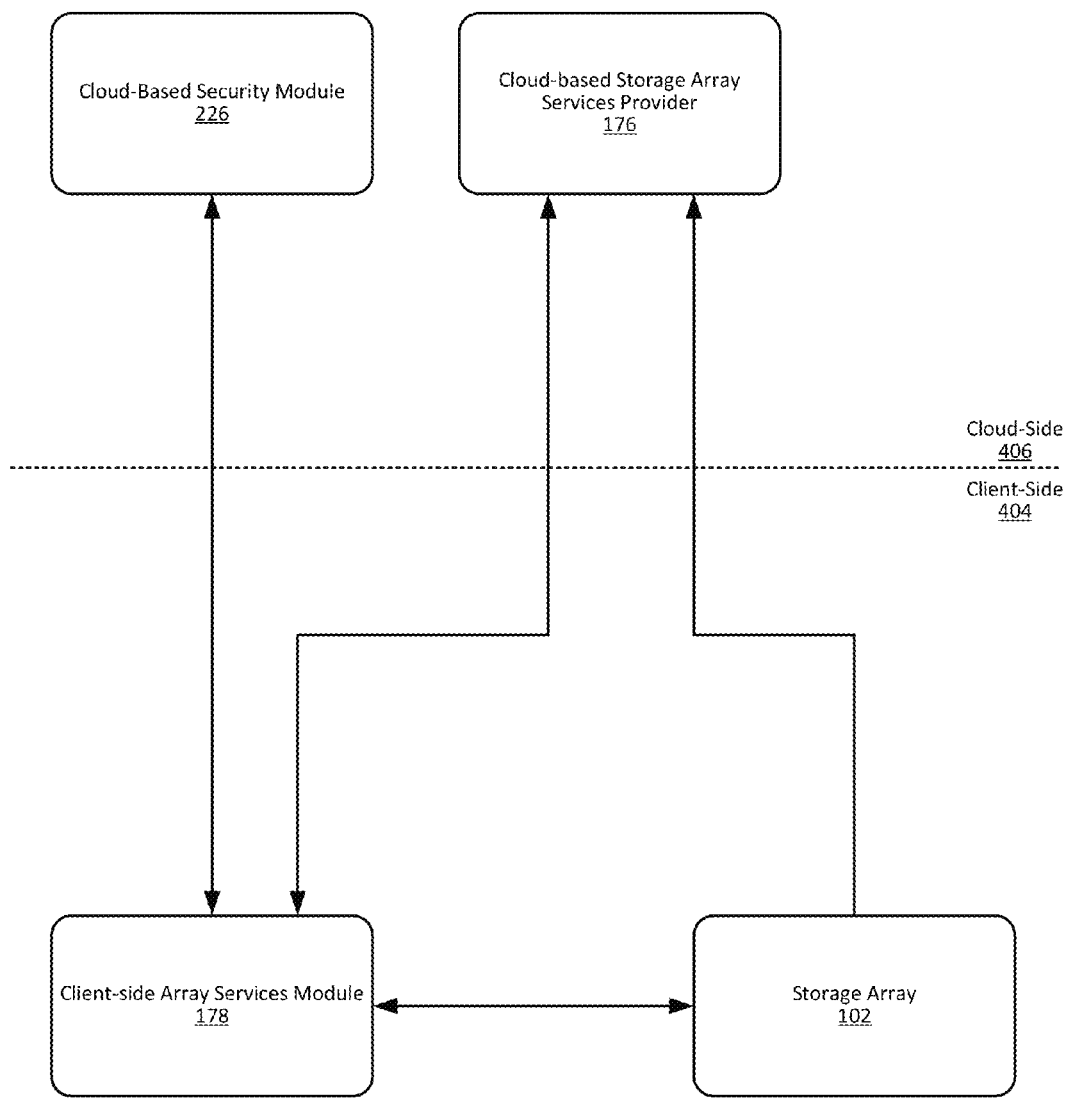
FIG. 5 sets forth a block diagram of an example system for managing a storage array according to embodiments of the present invention.

FIG. 5 sets forth a block diagram of an example system for managing a storage array according to embodiments of the present invention. The system of FIG. 5 includes a cloud-based storage array services provider (176) and a cloud-based security module (226), both of which reside outside the firewall or outside the local area network of a data center that includes a storage array (102). Residing outside the firewall or the outside the local area network is depicted in the example of FIG. 5 as being 'cloud-side' (406).

Devices and modules executing within the firewall or within the local area network of the data center are referred to as 'client-side' (404). In the example of FIG. 5, a storage array (102) and a client-side array services module (178) are both 'client-side'. The client-side array services module (178) may be client-side (404) either by a direct coupling to the local area network or through a virtual private network.

In the example of FIG. 5, the client-side array services module (178) may have bi-directional communication with the cloud-based storage array services provider (176) through the local area network and local firewall in order to perform authentication. The client-side array services module (178) may request authentication through the cloud-based storage array services provider (176) which re-directs the client-side array services module to the cloud-based security module (226).

The cloud-based security module (226) may provide a prompt to the client-side array services module (178) for retrieving user credentials. The client-side array services module (178) may provide those credentials through another bi-directional data communications connection through the local area network and through the local firewall. The cloud-based security module may authenticate the user credentials and return a token representing the authentication to the client-side array services module.

The client-side array services module (178) may receive the token and proceed to manage the storage array (102) without providing any further data communications outside the local area network and firewall. That is the client-side array services module (178) is configured to provide the token and a management instruction to the storage array (102) only through the local area network and within the local firewall.

The storage array (102) is configured to perform carry out such management instructions only after receiving a valid token from a client-side array services module (178) via data communications within the local area network and within the local firewall. In this way, the storage array (102) is effectively configured to ignore any management instructions that do not originate within the local area network.

The storage array (102) in the example of FIG. 5 may also be configured to report changes resulting from management instructions to the cloud-based storage array services provider (176) through a one-way data communications connection on the wide area network. In this way, the cloud-based storage array services provider (176) may be informed of any changes resulting from the management instructions while the storage array (102) continues to be configured to receive data communications only from a client-side array services module (178) within the local area network.

Figure 6:
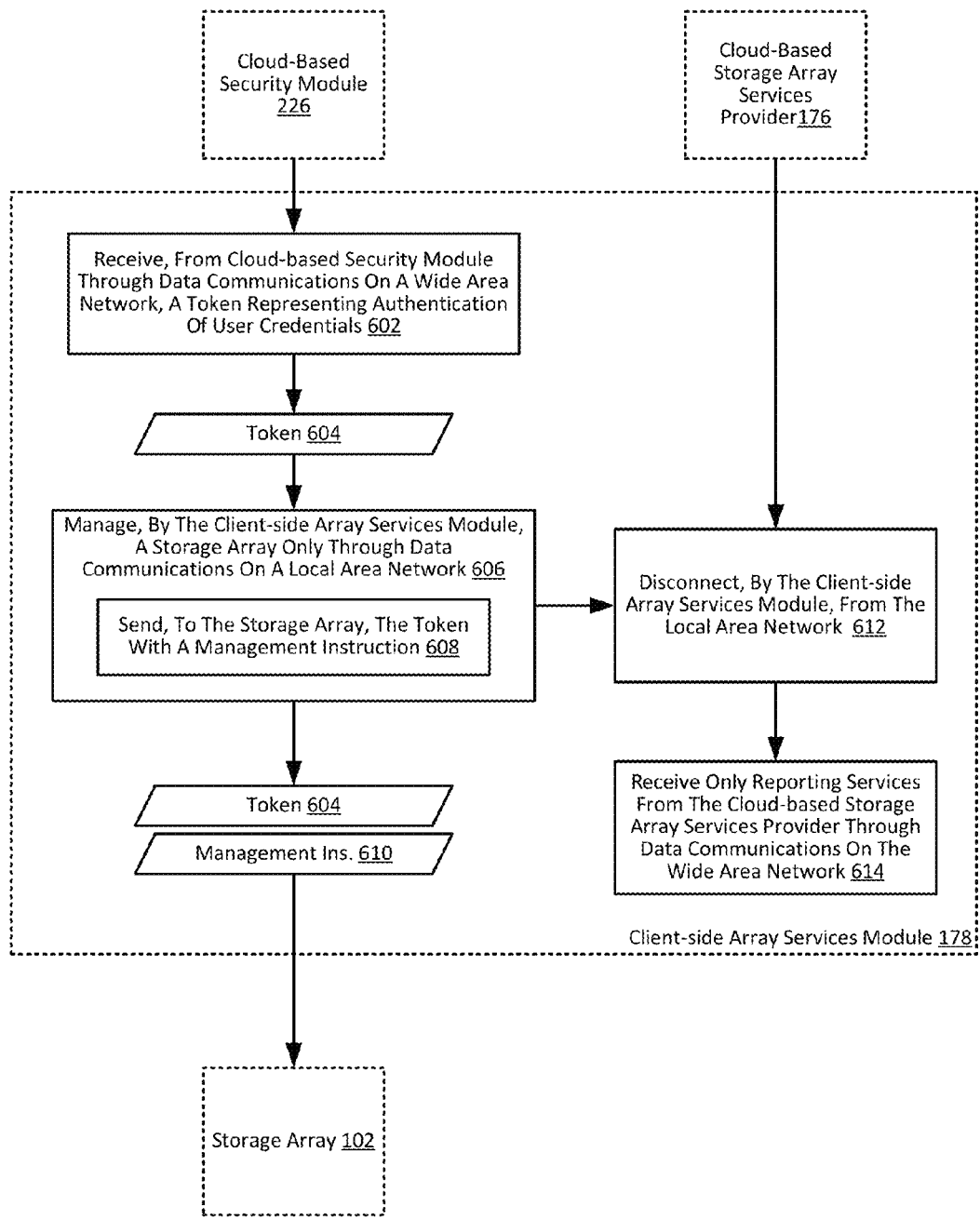
FIG. 6 sets forth a flow chart illustrating an exemplary method of managing a storage array according to embodiments of the present invention.

For further explanation, FIG. 6 sets forth a flow chart illustrating an exemplary method for managing a storage array according to embodiments of the present invention. The method of FIG. 6 includes receiving (602), by a client-side array services module (178) from a cloud-based security module (226) through data communications on a wide area network, a token (604) representing authentication of user credentials.

The method of FIG. 6 also includes managing (606), by the client-side array services module (178), a storage array (102) only through data communications on a local area network. In the method of FIG. 6 managing (606) the storage array includes sending (608), to the storage array (102), the token (604) with a management instruction (610). Managing a storage array in this manner may be carried out for a plurality of storage arrays. In some embodiments, the client-side array services module may be implemented as a web browser that supports cross-domain communications. One example type of cross-domain communications technology implemented by some web browsers includes CORS (Cross-Origin Resource Sharing). CORS enables one web page in a first domain (or 'origin') to request resources provided by a second web page in a second domain. In embodiments in which the client-side array services module (178) is implemented as a web browser, the cloud-based security module may be in a first domain and each separate storage array may be in a separate domain.

In addition to management instructions, the client-side array services module may also send requests for reporting of storage array performance characteristics, configuration control of the storage arrays, and the like. That is, in some embodiments, the client-side array services module may request such reports from the cloud-based storage array services provider, which is updated via a one-way data communications connection with the storage array (from the storage array to the services provider). Because such one-way communication may have some latency or be designed to report less data to reduce overall external bandwidth utilization, in some embodiments, while the client-side array services module is coupled to the storage array via a local area network, the client-side array services module may request reports directly from the storage array. In such an embodiment, the reports may be retrieved more quickly, have more information, and be more up-to-date than those reports that are retrieved from the cloud-based storage array services module.

In the method of FIG. 6, the client-side array services module (178) is coupled for data communications to a cloud-based storage array services provider (176) that provides reporting of various characteristics of the storage array. To that end, the method of FIG. 6 includes disconnecting (612), by the client-side array services module (178), from the local area network and receiving (614) only reporting services from the cloud-based storage array services provider (176) through data communications on the wide area network. In this way, the client-side array services module may gracefully degrade when leaving the local area network. That is, once the client-side array services module disconnects from the local area network, the client-side array services module may no longer manage the storage array, but is still able to receive reports regarding various characteristics of the storage array.

Figure 7:
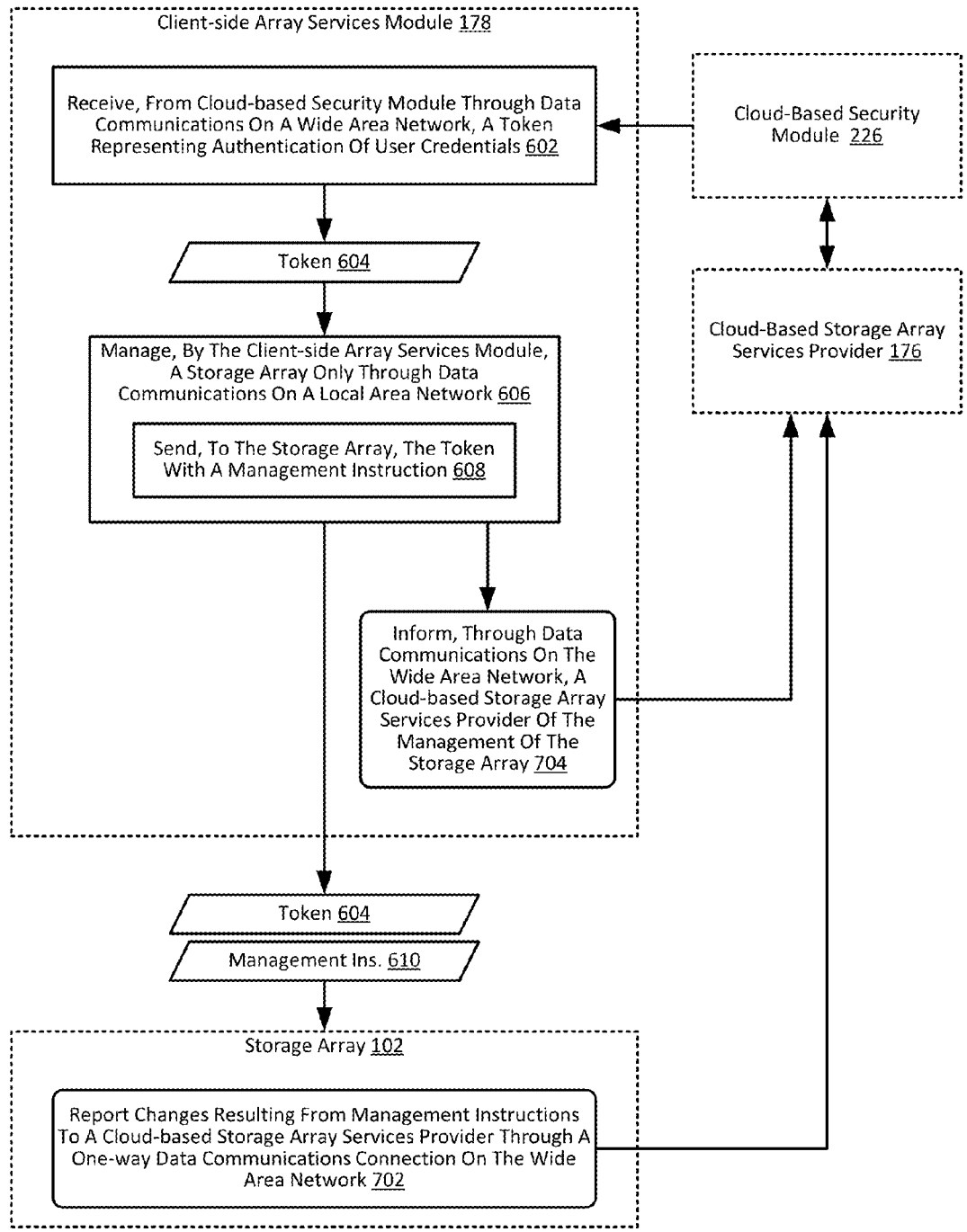
FIG. 7 sets forth a flow chart illustrating another method of managing a storage array in accordance with embodiments of the present invention.

For further explanation, FIG. 7 sets forth a flow chart illustrating another exemplary method for managing a storage array according to embodiments of the present invention. The method of FIG. 7 is similar to the method of FIG. 6, including as it does, receiving (602) a token representing authentication of user credentials and managing (606) the storage array only through data communications on a local area network.

The method of FIG. 7 differs from the method of FIG. 6, however, in that the method of FIG. 7 includes two alternative embodiments of reporting the results of management instructions to a cloud-based storage array service provider (176). In one embodiment, the method of FIG. 7 includes reporting (702), by the storage array (102), changes resulting from management instructions to a cloud-based storage array services provider through a one-way data communications connection on the wide area network. The storage array may be report the changes periodically in a batch, immediately upon completion of the management instructions, or in other ways.

In another embodiment, the method of FIG. 7 includes informing (704), by the client-side array services module through data communications on the wide area network, a cloud-based storage array services provider (176) of the management of the storage array. The client-side array services module may inform the cloud-based storage array services provider (176) in parallel with sending the instruction to the storage array, upon receipt of an indication of completion of the management instruction from the storage array (102), and in other ways as will occur to readers of skill in the art.

Exemplary embodiments of the present invention are described largely in the context of a fully functional computer system. Readers of skill in the art will recognize, however, that the present invention also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware, as hardware, or as an aggregation of hardware and software are well within the scope of embodiments of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of managing a storage array, the method comprising:
receiving, by a client-side array services module from a cloud-based security module through data communications on a wide area network, a token representing authentication of user credentials, the client-side array services module is coupled for data communications to a cloud-based storage array services provider;
authorizing based on the token, by the client-side array services module, transmission of a management instruction to the storage array;
informing, by the client-side array services module through data communications on the wide area network, the cloud-based storage array services provider of the management of the storage array;
managing, by the client-side array services module, a storage array only through data communications on a local area network, including sending, to the storage array, the management instruction with the token received over the wide area network, wherein the storage array is not coupled for data communications to the cloud-based security module;
disconnecting, by the client-side array services module, from the storage array via the local area network, wherein after disconnecting from the local area network, the client-side array services module no longer manages the storage array; and
in response to disconnecting the client-side array services module from the storage array via the local area network:
ceasing, management of the storage array including sending any management instructions to the storage array by the client-side array services module; and
subsequent to disconnecting the client-side array services module from the storage array via the local area network, the client-side array services module receives only reporting services resulting from the management instructions regarding the storage array from the cloud-based storage array services provider through data communications on the wide area network, and the storage array is configured to report changes resulting from management instructions to a cloud-based storage array services provider through a one-way data communications connection on the wide area network.

2. The method of claim 1, wherein: the client-side array services module further comprises a web browser that supports cross-domain communications; the cloud-based security module comprises a first domain and the storage array comprises a second domain.

3. The method of claim 1, wherein the cloud-based security module comprises a component of a cloud-based storage array services provider.

4. An apparatus for managing a storage array, the apparatus comprising a computer processor, a computer memory operatively coupled to the computer processor, the computer memory having disposed within it computer program instructions that, when executed by the computer processor, cause the apparatus to carry out the steps of:
receiving, by a client-side array services module from a cloud-based security module through data communications on a wide area network, a token representing authentication of user credentials, the client-side array services module is coupled for data communications to a cloud-based storage array services provider;
authorizing based on the token, by the client-side array services module, transmission of a management instruction to the storage array;
informing, by the client-side array services module through data communications on the wide area network, the cloud-based storage array services provider of the management of the storage array;
managing, by the client-side array services module, a storage array only through data communications on a local area network, including sending, to the storage array, the management instruction with the token received over the wide area network, wherein the storage array is not coupled for data communications to the cloud-based security module;
disconnecting, by the client-side array services module, from the local area network, wherein after disconnecting from the local area network, the client-side array services module no longer manages the storage array; and
in response to disconnecting the client-side array services module from the storage array via the local area network:
ceasing management of the storage array including sending any management instructions to the storage array by the client-side array services module; and
subsequent to disconnecting the client-side array services module from the storage array via the local area network, the client-side array services module receives only reporting services resulting from the management instructions regarding the storage array from the cloud-based storage array services provider through data communications on the wide area network, and the storage array is configured to report changes resulting from management instructions to a cloud-based storage array services provider through a one-way data communications connection on the wide area network.

5. The apparatus of claim 4, wherein:
the client-side array services module further comprises a web browser that supports cross-domain communications;
the cloud-based security module comprises a first domain and the storage array comprises a second domain.

6. The apparatus of claim 4, wherein the cloud-based security module comprises a component of a cloud-based storage array services provider.

7. A computer program product for managing a storage array, the computer program product disposed upon a non-transitory computer readable medium and computer program instructions that, when executed, cause a computer to carry out the steps of:
receiving, by a client-side array services module from a cloud-based security module through data communications on a wide area network, a token representing authentication of user credentials, the client-side array services module is coupled for data communications to a cloud-based storage array services provider;
authorizing based on the token, by the client-side array services module, transmission of a management instruction to the storage array;
informing, by the client-side array services module through data communications on the wide area network, the cloud-based storage array services provider of the management of the storage array;
managing, by the client-side array services module, a storage array only through data communications on a local area network, including sending, to the storage array, a management instruction with the token received over the wide area network, wherein the storage array is not coupled for data communications to the cloud-based security module;
receiving, by the client-side array services module from the storage array, an indication that the management instruction has completed;
informing, by the client-side array services module through data communications on the wide area network, a cloud-based storage array services provider that the management instruction has completed;
disconnecting, by the client-side array services module, from the storage array via the local area network, wherein after disconnecting from the local area network, the client-side array services module no longer manages the storage array; and
in response to disconnecting the client-side array services module from the storage array via the local area network:
ceasing management of the storage array including sending any management instructions to the storage array by the client-side array services module; and
subsequent to disconnecting the client-side services module from the storage array via the local area network, the client-side array services module receives only reporting services resulting from the management instructions regarding the storage array from the cloud-based storage array services provider through data communications on the wide area network, and the storage array is configured to report changes resulting from management instructions to a cloud-based storage array services provider through a one-way data communications connection on the wide area network.

8. The computer program product of claim 7, wherein: the client-side array services module further comprises a web browser that supports cross-domain communications; the cloud-based security module comprises a first domain and the storage array comprises a second domain.

9. The computer program product of claim 7, wherein the cloud-based security module comprises a component of a cloud-based storage array services provider.

* * * * *